(12) United States Patent
Leara et al.

(10) Patent No.: US 11,816,491 B2
(45) Date of Patent: Nov. 14, 2023

(54) RUNTIME CONFIGURATION OF CHIPSET TO SUPPORT MULTIPLE I/O SUBSYSTEM VERSIONS WITH ONE BIOS IMAGE

(71) Applicant: Dell Products L.P., Round Rock, TX (US)

(72) Inventors: William D. Leara, Round Rock, TX (US); Chien-Yi Juan, New Taipei City (TW); Rong-Yu Wang, New Taipei City (TW); Jui-Hsing Chiu, Taipei City (TW)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 17/375,911

(22) Filed: Jul. 14, 2021

(65) Prior Publication Data

US 2023/0018849 A1     Jan. 19, 2023

(51) Int. Cl.
*G06F 9/4401* (2018.01)
*G06F 13/42* (2006.01)

(52) U.S. Cl.
CPC .......... *G06F 9/4411* (2013.01); *G06F 13/4282* (2013.01); *G06F 2213/0042* (2013.01)

(58) Field of Classification Search
CPC .................................................. G05D 1/0297
See application file for complete search history.

(56) References Cited

U.S. PATENT DOCUMENTS 7,475,238 B1*   1/2009   Yakovlev ............. G06F 9/4411
                                                  713/1
9,195,580 B2*   11/2015   Cantwell et al. ... G06F 12/0238

* cited by examiner

*Primary Examiner* — Henry Tsai
*Assistant Examiner* — Juanito C Borromeo
(74) *Attorney, Agent, or Firm* — Jackson Walker L.L.P

(57) ABSTRACT

A method for configuring a peripheral bus of an information handling system performs, as part of a boot sequence, an initial configuration of a chipset setting pertaining to the bus based on a descriptor stored in a nonvolatile storage resource. After an operating system is loaded, a controller detects a peripheral device connecting to the bus and responds by performing a runtime configuration of the chipset setting based on capability information obtained from the peripheral device. The peripheral bus may comprise a USB pipe and a USB-C type connector, wherein the peripheral device is detected by a USB power delivery (PD) controller based on configuration channel (CC) pins of the USB-C connector. The PD controller may signal the chipset and send the device's capability information to the chipset. The PD controller may assert a PMCALERT# signal of the chipset's and send the capability information via a system management link (SMLink1).

16 Claims, 3 Drawing Sheets

RUNTIME CONFIGURATION OF CHIPSET TO SUPPORT MULTIPLE I/O SUBSYSTEM VERSIONS WITH ONE BIOS IMAGE

TECHNICAL FIELD

The present disclosure relates to information handling systems and, more specifically, the management and configuration of chipset devices and I/O subsystems including USB subsystems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handlings systems are configured with one or more central processing units (CPUs) and a chipset device for coupling the CPU(s) to various peripheral devices and busses. In at least some information handling systems, chipset features are configured though a statically-generated, XML-formatted, configuration file, which is consumed by the BIOS once, at build time. The chipset features configured in this manner may define, as examples, the configuration of peripheral busses including, USB, and peripheral bus controllers, including USB Power Delivery (PD) controllers and chipset settings may indicate, as example, USB connector type, USB port speed, USB port pairing, PD re-timer options, and other like settings.

In the factory, this fixed configuration is imprinted upon a nonvolatile storage device in a region called the Flash Descriptor. Once the system leaves the factory, these settings cannot be changed.

One manifestation of this limitation is that it breaks Dell's Front I/O upsell strategy. Dell would like to offer customers a "Base" Front I/O package and also an "Upsell" Front I/O package with a different (i.e. faster) USB port configuration. Due to this limitation, however, having one system BIOS to support both Front I/O module options is impossible because each Front I/O option requires a unique PCH configuration, and BIOS is neither able to support two Flash Descriptors in one image nor to dynamically choose a configuration at run-time.

In this disclosure we describe a method to auto-switch the fixed PCH configuration at run-time. Specifically, we support both Front I/O modules (USB3.2 Gen2×1 and Gen2×2) with a single BIOS (single SPI Flash Descriptor) by novel use of the PD firmware and BIOS

SUMMARY

The unchangeable boot configuration of the chipset limits the ability of original equipment manufacturers and others from offering post-factory customization for any setting configured by the chipset descriptor because multiple chipset configurations would necessitate a corresponding number of BIOS images since a single BIOS image cannot support multiple Flash Descriptions or dynamically choose a configuration at run-time.

Problems associated with static chipset configurations are addressed by methods and systems disclosed herein. A method for configuring a peripheral bus of an information handling system performs, as part of a boot sequence, an initial configuration of a chipset setting pertaining to the bus based on a descriptor stored in a nonvolatile storage resource. After an operating system is loaded, a controller detects a peripheral device connecting to the bus and responds by performing a runtime configuration of the chipset setting based on capability information obtained from the peripheral device. The peripheral bus may comprise a USB pipe and a USB-C type connector, wherein the peripheral device is detected by a USB PD controller based on configuration channel (CC) pins of the USB-C connector. The PD controller may signal the chipset and send the device's capability information to the chipset. The PD controller may assert an appropriate chipset input to signal the chipset and send applicable capability information to the chipset via a system management link or another suitable sideband communication bus. The USB subsystem may include a PD re-timer device to boost signal integrity and the power delivery (PD) controller may configure the PD re-timer by sending the connected device's capability information to the re-timer via an I2C bus or the like. In at least one embodiment, the initial configuration is a USB 3.2 Gen2×1 configuration and the runtime configuration is a USB 3.2 Gen2×2 configuration. Conversely, in at least one other embodiment, the initial configuration is a USB 3.2 Gen2×2 configuration and the runtime configuration is a USB 3.2 Gen2×1 configuration.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
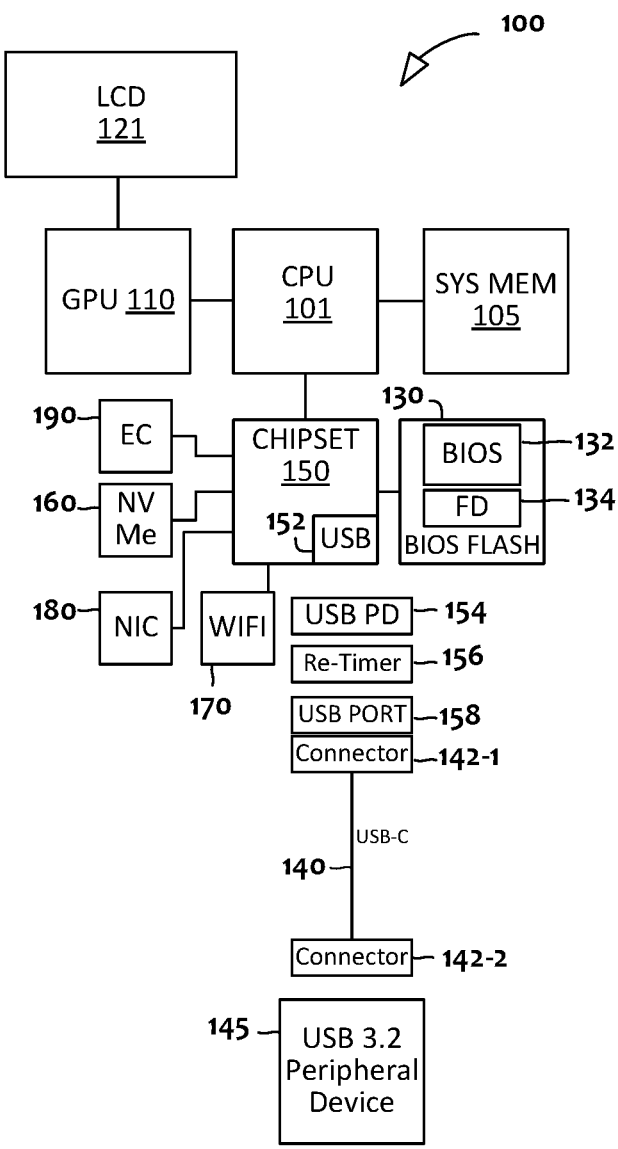
FIG. 1 illustrates an information handling system.
Figure 2:
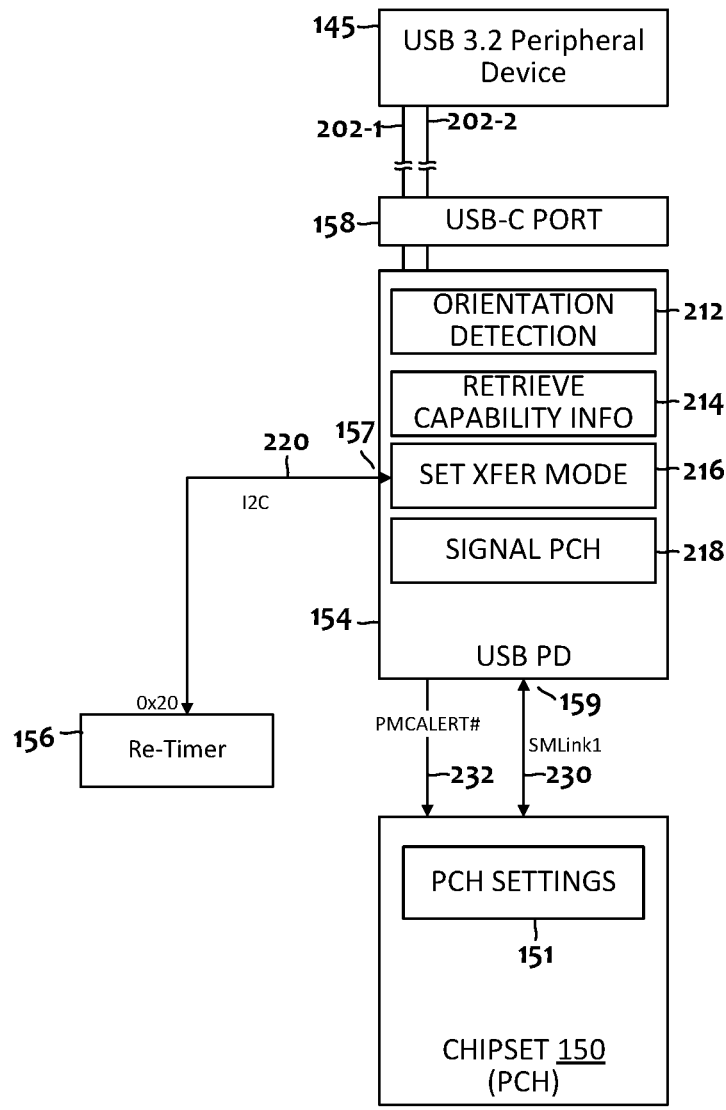
FIG. 2 illustrates aspects of a peripheral bus subsystem of the information handling system of FIG. 1.
Figure 3:
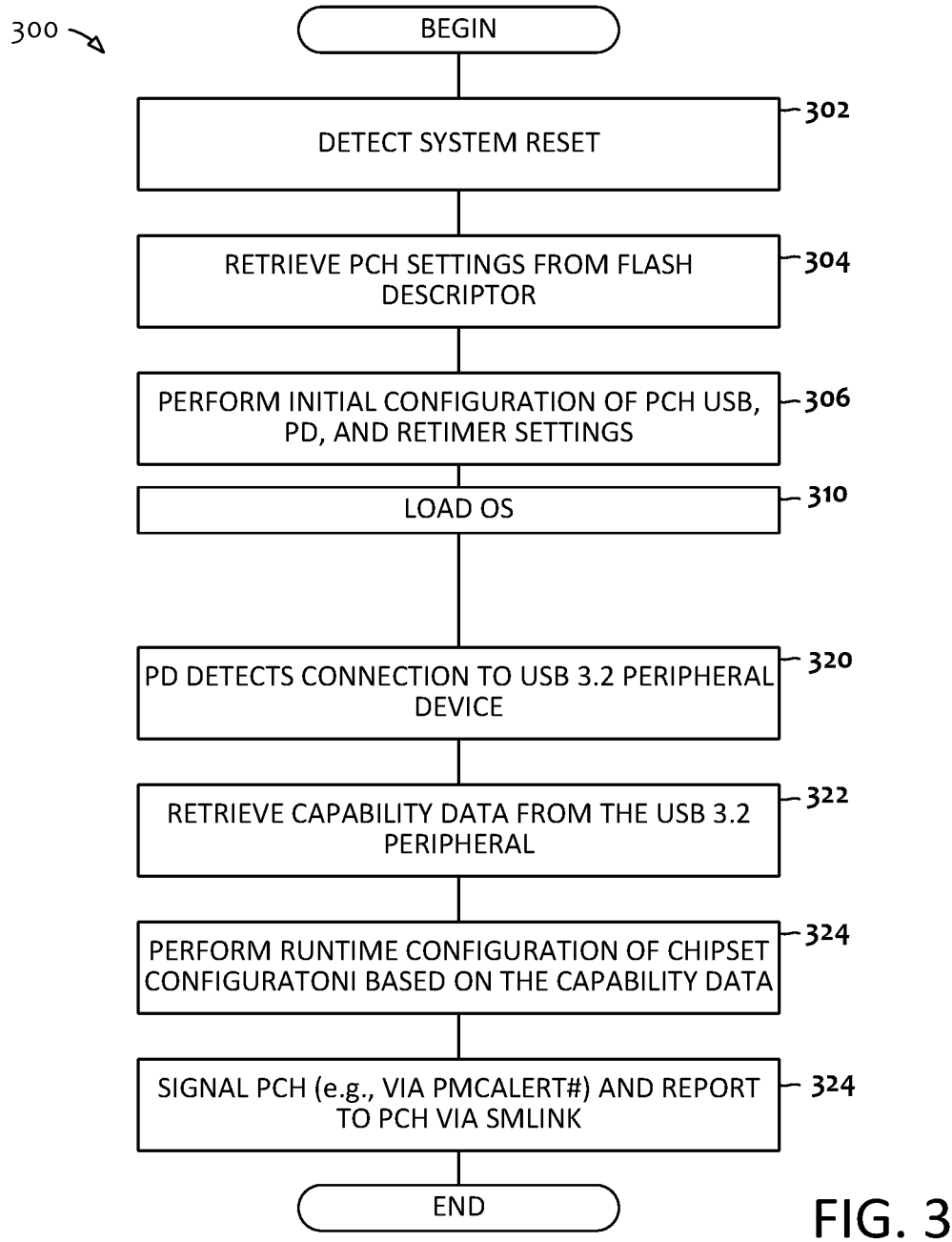
FIG. 3 illustrates a peripheral bus configuration method in accordance with disclosed subject matter.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to FIG. 1, an information handling system 100, also referred to herein simply as platform 100, in accordance with disclosed subject matter is illustrated. As depicted in FIG. 1, platform 100 includes a central processing unit (CPU) 101 communicatively coupled to a system memory 105 and a graphics processing unit (GPU) 110, to which a liquid crystal display (LCD) 121 is connected. The illustrated CPU 101 is further coupled to a chipset device referred to herein simply as chipset 150. Chipset 150 provides interconnects between CPU 101 and various peripheral devices and peripheral busses including, in the illustrated embodiment, a non-volatile storage resource identified as nonvolatile memory express (NVMe) 160, A Wi-Fi radio/antenna adapter 170, a network interface card (NIC) 180, an embedded controller 190, and a non-volatile storage resource identified as BIOS flash 130. The BIOS flash of FIG. 1 includes BIOS code 132 and a data structure identified as flash descriptor 134. In at least one embodiment, flash descriptor 134 includes factory-set settings for configuring one or more of the various I/O interfaces supported by the chipset.

The chipset 150 illustrated in FIG. 1 supports a USB subsystem 150 that includes an integrated USB controller 152 supporting one or more USB ports 158 (one of which is illustrated in FIG. 1). The USB subsystem 150 of FIG. 1 further includes a USB PD controller 154 and a re-timer device 156 for ensuring the integrity of high speed data signals between USB host controller 152 and a USB peripheral device 145. USB peripheral device 145 is illustrated in FIG. 2 connected to USB subsystem 150 by way of a USB-C cable 140 including a pair of USB-C connectors 142-1 and 142-2.

Although FIG. 1 illustrates information handling system 100 with a particular combination and configuration of components and devices, other embodiments may incorporate numerous variations that will be readily recognized by those of ordinary skill in the field of microprocessor-based system design. As an example, although FIG. 1 illustrates an embedded controller 190, the information handling system 100 may include a baseboard management controller instead. As another example, although the depicted system includes NVMe mass storage, other embodiments may include hard disk drives in addition to or in lieu of NVMe 160.

Referring now to FIG. 2, additional detail of the USB subsystem 150 illustrated in FIG. 1 is depicted. For the sake of clarity and brevity, the USB-C cable 140 and the corresponding connectors 142 illustrated in FIG. 1 are omitted from FIG. 2. As illustrated in FIG. 2, USB-C configuration channel (CC) signals 202-1 and 202-2 are connected between peripheral device 145, USB-C port 158, and USB power delivery controller 154. In accordance with USB-C standards, the transport includes two CC signals, CC1 202-1 and CC2 202-2. CC signals 202 enable a mandatory reversibility feature and characteristic of USB-C connectors. CC signals 202 are pulled low or high, in a manner defined by the standard, when a USB-C compliant device is connected to USB-C port 158.

In at least one embodiment, when USB peripheral device 145 is connected to the USB subsystem 150 illustrated in FIG. 2, the USB PD controller 154 initiates a runtime configuration of one or more the chipset settings. The illustrated USB PD controller 154 includes an I2C port 157 and a system management bus port 159. The I2C port 157 is shown coupled to an I2C port of re-timer 156 over I2C bus 220 and the system management bus port 159 is coupled to a system management port of chipset 150 via SMLink1 230. In addition, the illustrated USB PD 154 includes an output 232 connected to a PMCALERT# signal pin of chipset 150. These connections enable the illustrated USB PD 154 to signal chipset 150 and to write values into retimer 156 and PCH setting 151 of chipset 150.

FIG. 2 also depicts functions performed by USB PD controller 154. The illustrated functions include orientation detection 212, which occurs when a peripheral device connects to the USB subsystem 150. Because the two CC signals are routed through I/O pins located on opposing sides of the connector and one of the two CC signals 202-1 or 202-2 will be pulled down when USB device 145 is connected to the USB subsystem. By "decoding" the voltages on the two CC pins, the orientation of the device can be determined. Upon detecting a peripheral device connecting and determining the devices orientation, the illustrated PD controller retrieves, reads, or otherwise obtains capability information from the attached peripheral device and uses the capability information to reconfigure the chipset setting when necessary. The PD controller 154 may then set the data rate or transfer mode of retimer 156 via I2C bus 220. The USB PD controller 154 may than signal the chipset, by asserting PMCALERT# signal 232 and providing the configuration to chipset 150 via SMLink1 230. In at least some embodiments, the USB data rate is the chipset configuration setting or one of the chipset configuration settings that is set as part of the runtime configuration.

Referring now to FIG. 3, a method for configuring an I/O subsystem, such as the USB subsystem illustrated in FIG. 2, is illustrated in block diagram format. The configuration method 300 illustrated in FIG. 3 begins with the detection (block 302) of a system reset signal, which may correspond to the system waking up or powering on from a sleep state. Upon detecting the system reset, the illustrated configuration method performs an initial configuration of various settings including various chipset settings configuring one or more I/O resources such as the USB subsystem illustrated in FIG. 2. As described previously, the information handling system supports a single BIOS image and this image retrieves chipset settings from the flash descriptor as programmed in the factory. Accordingly, during the initial configuration, the system retrieves (block 304) chipset settings from the flash descriptor and performs an initial configuration (block 306) by configuring the chipset in accordance with the predefined settings in the flash descriptor, possibly without regard to whether the corresponding system resources are supported by the flash descriptor settings. Examples of chipset settings that may be set during the initial configuration in block 306 include, as non-limiting examples, chipset settings for USB, PD, and re-timer parameters for the USB sub system illustrated in FIG. 2.

Following completion of the initial configuration and the loading (block 310) of an operating system, the information handling system is in a working state referred to herein as the runtime state. While executing in the runtime state, the PD controller may detect (Block 320) a peripheral device connecting to the I/O subsystem. For USB embodiments, the PD controller may detect the connection of a USB 3.2 peripheral device connecting to the USB subsystem 150.

In at least one embodiment, the detection of a peripheral device connecting to the I/O subsystem triggers a reconfiguration sequence during which the PD controller retrieves (block 322) capability information from the peripheral device and then forces an explicit reconfiguration, referred to herein as a runtime configuration (block 324), based on the capability information retrieved in block 322).

In at least one embodiment, the PD controller explicitly signals the chipset to reconfigure at least one chipset configuration parameter. As an example applicable to systems that support two different versions of a USB 3.2 subsystem, a platform seller or distributor may offer customers a post-factory customization of the system's USB 3.2 subsystem. In one example, the customization includes a USB module upgrade, from a 3.2 Gen2×1 module, which has a 10 Gbps maximum transfer mode, to a 3.2 Gen2×2 module, which has 20 Gbps maximum transfer mode. Conversely, another example may include an economizing customization, from a factory-delivered system having a USB 3.2 Gen2×2 module to a post-factory system that includes and supports a USB 3.2 Gen2×1 module. Because the Gen2×2 and Gen2×1 versions of USB 3.2 include one or more differences in flash descriptor settings, including different maximum transfer rates and potentially different PD re-timers, no single flash descriptor can support both USB modules and no single BIOS image can boot both USB modules properly.

In at least one embodiment suitable for implementations employing a PCH (Platform Controller Hub) chipset device from Intel, the runtime configuration operation may be achieved by configuring the PD controller to signal (block 326) the PCH while sending suitable configuration information to the PCH. The PD controller may assert the PCH's PMCALERT# signal to alert the PCH. The PD controller may also send the appropriate configuration information to the PCH via a system management link to which both devices are connected, e.g., the SMLink1 bus. In this manner, a device manufacturer may offer its customers a post-factory customization that is supported from a single BIOS image.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for configuring a peripheral bus of an information handling system, wherein the method comprises:
   performing an initial configuration, in accordance with a descriptor stored in a nonvolatile storage resource of the information handling system, of a chipset setting associated with the peripheral bus;
   after performing the initial configuration, detecting a peripheral device connecting to the peripheral bus;
   receiving capability information, indicative of a capability of the peripheral bus; and
   responsive to receiving the capability information, performing a runtime configuration of the chipset setting in accordance with the capability information
   wherein the initial configuration is performed by system BIOS during a boot sequence and wherein detecting the peripheral device and reconfiguring the chipset setting occurs after an operating system is loaded.

2. The method of claim 1, wherein the peripheral bus comprises a universal serial bus (USB) pipe and wherein a USB-C connector connects the peripheral device to the USB pipe.

3. The method of claim 2, wherein detecting the peripheral device connecting to the USB pipe comprises detecting, by a power delivery (PD) controller, an assertion of a configuration channel (CC) pin.

4. The method of claim 3, wherein the PD controller is configured to respond to said detecting by signaling the chipset and sending capability information to the chipset.

5. The method of claim 4, wherein the PD controller is configured to send capability information to the chipset via a system management link to which the PD controller and the chipset are connected.

6. The method of claim 3, wherein the PD controller is configured to respond to said detecting by sending capability information to a PD re-timer.

7. The method of claim 3, wherein the initial configuration comprises a USB 3.2 Gen2×1 configuration and the runtime configuration comprises a USB 3.2 Gen2×2 configuration.

8. The method of claim 3, wherein the initial configuration comprises a USB 3.2 Gen2×2 configuration and the runtime configuration comprises a USB 3.2 Gen2×1 configuration.

9. An information handling system, comprising:
   a central processing unit (CPU);
   a chipset configured to couple a peripheral bus to the CPU; and
   system memory communicatively coupled to the CPU, including processor executable instructions that, when executed by the processor, cause the system to perform peripheral bus configuration operations comprising:
      performing an initial configuration, in accordance with a descriptor stored in a nonvolatile storage resource of the information handling system, of a chipset setting associated with the peripheral bus;
      after performing the initial configuration, detecting a peripheral device connecting to the peripheral bus;
      receiving capability information, indicative of a capability of the peripheral bus; and
      responsive to receiving the capability information, performing a runtime configuration of the chipset setting in accordance with the capability information
      wherein the peripheral bus comprises a universal serial bus (USB) pipe and wherein a USB-C connector connects the peripheral device to the USB pipe.

10. The information handling system of claim 9, wherein the initial configuration is performed by system BIOS during a boot sequence and wherein detecting the peripheral device and reconfiguring the chipset setting occurs after an operating system is loaded.

11. The information handling system of claim 9, wherein detecting the peripheral device connecting to the USB pipe comprises detecting, by a power delivery (PD) controller, an assertion of a configuration channel (CC) pin.

12. The information handling system of claim 11, wherein the PD controller is configured to respond to said detecting by signaling the chipset and sending capability information to the chipset.

13. The information handling system of claim 12, wherein the PD controller is configured to send capability information to the chipset via a system management link to which the PD controller and the chipset are connected.

14. The information handling system of claim 11, wherein the PD controller is configured to respond to said detecting by sending capability information to a PD re-timer.

15. The information handling system of claim 11, wherein the initial configuration comprises a USB 3.2 Gen2×1 configuration and the runtime configuration comprises a USB 3.2 Gen2×2 configuration.

16. The information handling system of claim 11, wherein the initial configuration comprises a USB 3.2 Gen2×2 configuration and the runtime configuration comprises a USB 3.2 Gen2×1 configuration.

* * * * *